(12) United States Patent
Miyake et al.

(10) Patent No.: US 7,219,629 B2
(45) Date of Patent: May 22, 2007

(54) BREATHING SYSTEM IN COMBUSTION ENGINE

(75) Inventors: Hitomi Miyake, Miki (JP); Takemi Inoue, Kakogawa (JP); Ichiro Uemura, Kobe (JP); Tetsuhiro Yamakawa, Maryvill, MO (US)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 11/178,720

(22) Filed: Jul. 11, 2005

(65) Prior Publication Data

US 2007/0006857 A1   Jan. 11, 2007

(51) Int. Cl.
F02M 25/06 (2006.01)

(52) U.S. Cl. .................................... 123/25 A; 123/572

(58) Field of Classification Search ............. 123/41.86, 123/572, 573, 574, 184.57, 198 E
See application file for complete search history.

(56) References Cited

U.S. PATENT DOCUMENTS 3,738,088 A * 6/1973 Colosimo ..................... 96/26

6,805,088 B2 * 10/2004 Tachibana et al. ..... 123/184.47

FOREIGN PATENT DOCUMENTS

JP        2556039        8/1997

* cited by examiner

*Primary Examiner*—Stephen K. Cronin
*Assistant Examiner*—Hyder Ali

(57) ABSTRACT

A breathing system in a combustion engine includes an air cleaner (3) for purifying air to be supplied to the engine. The air cleaner (3) includes a cleaner casing (30) having a blow-by gas inlet port (33) and an intake air discharge port (34). The breathing system also includes a breather passage (8) having first and second breather passage portions. The first breather passage portion is fluidly connected with the inlet port (33) for communicating a crank chamber (1a) to a portion of an interior of the air cleaner (3) downstream of the cleaner element (50). The second breather passage portion fluidly connects the blow-by gas inlet port (33) and the intake air discharge port (34) and has a drain hole (95) for draining into the cleaner casing (30) a water component, separated from a blow-by gas (G) flowing through the breather passage (8).

7 Claims, 15 Drawing Sheets

BREATHING SYSTEM IN COMBUSTION ENGINE

BACKGROUND OF THE INVENTION

1. Field of the Invention

The present invention relates to a breathing system in a four-cycle combustion engine that is used as a drive source for a working machine, for example, a small-size snowplow.

2. Description of the Prior Art

The conventional breather passage employed in the four-cycle combustion engine is formed with a breather chamber into which a blow-by gas leaking from the combustion chamber into a crank chamber through around an outer periphery of a reciprocating piston is introduced. Within this breather chamber, an oil component such as oil mists contained in the blow-by gas is separated from the blow-by gas. The separated oil component is returned to the crank chamber. On the other hand, the blow-by gas, from which the oil component has been removed, is supplied to the combustion chamber through an intake system of the combustion engine so that reburning of the blow-by gas can be carried out within the combustion chamber. See, for example, the Japanese Utility Model Registration No. 2556039.

As is well known to those skilled in the art, the blow-by gas leaking from the combustion chamber contains a substantial amount of water component. For this reason, it is desirable to remove the water component from the blow-by gas prior to the blow-by gas being supplied to the fuel intake system of the combustion engine. It has, however, been found that the prior art breather passage cannot sufficiently separate and remove the water component contained in the blow-by gas.

SUMMARY OF THE INVENTION

In view of the foregoing, the present invention is intended to provide a breathing system in a combustion engine, which is effective to separate and remove a water component contained in a blow-by gas.

In order to accomplish the foregoing object of the present invention, there is in accordance with the present invention provided a breathing system in a combustion engine, which includes an air cleaner having a replaceable cleaner element and operable to purify air to be supplied to the combustion engine as the air flows through the cleaner element. This air cleaner includes a cleaner casing having a blow-by gas inlet port and an intake air discharge port both defined therein. The breathing system also includes a breather passage having a first breather passage portion and a second breather passage portion. The first breather passage portion is fluidly connected with the blow-by gas inlet port of the cleaner casing for communicating a crank chamber to a portion of an interior of the air cleaner downstream of the cleaner element. The second breather passage portion fluidly connects the blow-by gas inlet port and the intake air discharge port and has a drain hole defined therein for draining into the cleaner casing a water component, separated from a blow-by gas flowing through the breather passage.

According to the present invention, the oil component such as oil mist contained in the blow-by gas can be separated and removed from the blow-by gas as the latter from the crank chamber flows through the breather passage. Also, as the blow-by gas flows through the second breather passage portion formed in the breather passage, the water component contained in the blow-by gas and having a high specific gravity collides against an inner surface of the second breather passage portion under the influence of a centrifugal force and is therefore separated and removed from the blow-by gas then flowing through the second breather passage portion. The blow-by gas, from which the water component has been removed, is subsequently supplied to the intake system of the combustion engine through the intake air discharge port together with the air purified by the cleaner element of the air cleaner. On the other hand, the water component separated and removed from the blow-by gas is drained into the air cleaner casing through the drain hole formed in the second breather passage portion.

In a preferred embodiment of the present invention, a baffling projection may be formed in the blow-by gas inlet port. This baffling projection may have a baffling face lying perpendicular to the direction of flow of the blow-by gas. The blow-by gas collides against the baffling face as it flows into the curved passage portion through the blow-by gas inlet port. This collision facilitates separation and removal of the water component from the blow-by gas.

In another preferred embodiment of the present invention, the blow-by gas inlet port may be positioned below the intake air discharge port and the curved passage portion may be formed with a zigzag flow path for flowing the blow-by gas in a zigzag fashion. In this case, the drain hole is defined in a lowermost portion of the curved passage portion.

According to this preferred embodiment, since the blow-by gas can flow from the blow-by gas inlet port towards the intake air discharge port upwardly through the zigzag flow path, the blow-by gas collides against a wall of the zigzag flow path as it flows upwardly through the zigzag flow path, so that the water component of a relatively high specific gravity can be separated and removed from the blow-by gas. Also, the water component removed from the blow-by gas can be drained into the cleaner casing through the drain hole defined in the lowermost portion of the curved passage portion.

Preferably, the zigzag flow path may be made up of a generally U-shaped wall formed integrally formed with a side wall of the cleaner casing, a baffling plate so formed integrally with the U-shaped wall as to protrude inwardly of the zigzag flow path, and a passage cover for closing an opening of the U-shaped wall opposite to the side wall of the cleaner casing.

In a further preferred embodiment of the present invention, the blow-by gas inlet port may be positioned adjacent the intake air discharge port and the curved passage portion may include a generally U-shaped duct having a downstream duct portion inserted into an upstream portion of the air discharge port. In such case, the downstream duct portion of the duct may preferably have a cross-sectional area (passage area) smaller than those of other duct portions of the duct to define a small diameter duct portion, so that the blow-by gas can be smoothly discharged from the duct by the ejector effect brought about by the air flowing out of the intake air discharge port.

In a still further preferred embodiment of the present invention, the cleaner casing may be made up of first and second casing halves, which are separable from each other in a horizontal direction. The first casing half is positioned adjacent a carburetor and is provided with the blow-by gas inlet port for receiving the blow-by gas, the intake air discharge port and the curved passage portion, while the second casing half accommodates the cleaner element for purifying the air. The provision of the blow-by gas inlet port, the intake air discharge port and the curved passage portion in the first casing half allows the space available in the second casing half to be used to accommodate the cleaner element.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Hereinafter, preferred embodiments of the present invention will be described in detail with reference to the accompanying drawings.

Figure 1:
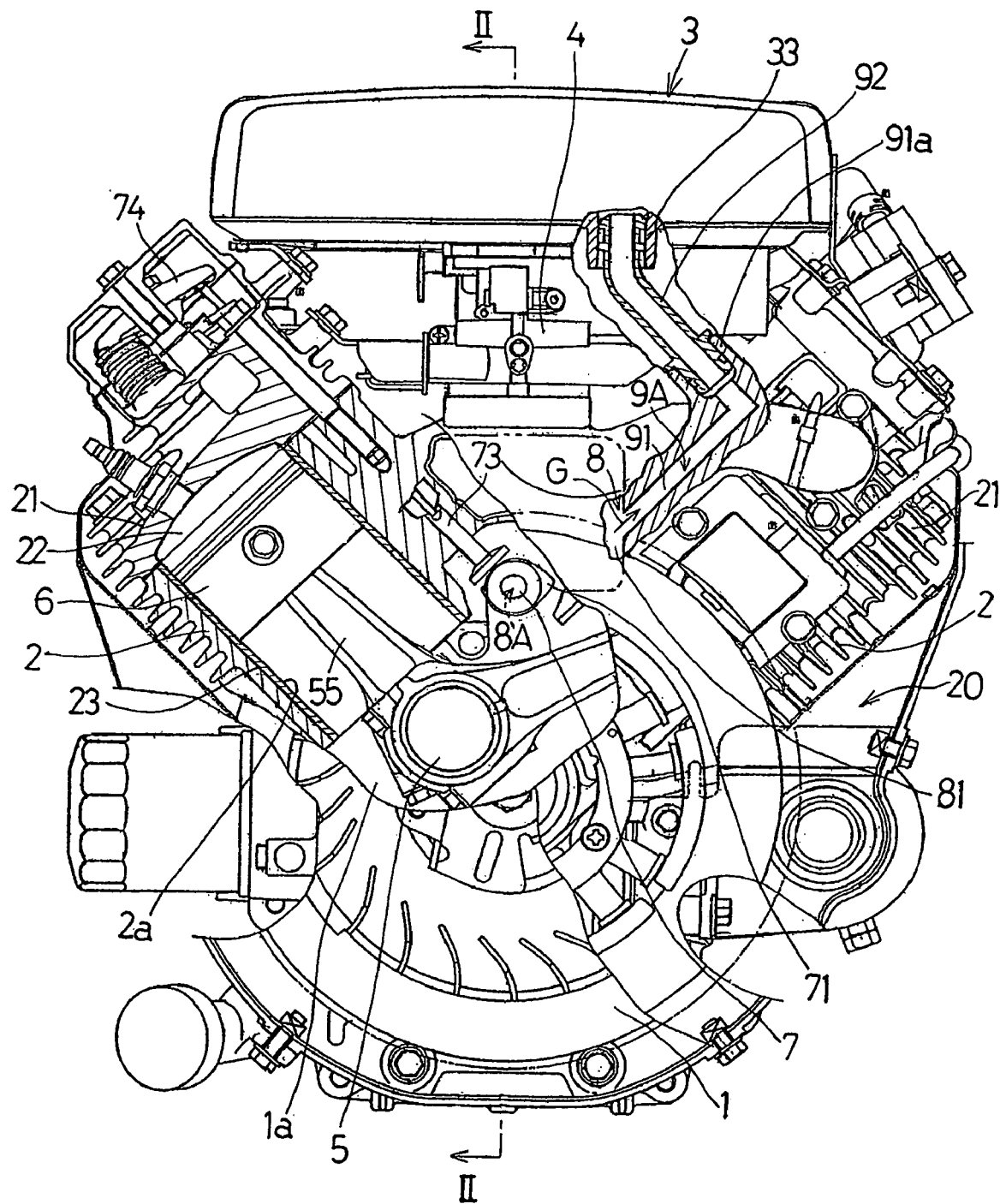
FIG. 1 is a plan view, with a portion cut out, of a combustion engine employing a breathing system according to a first preferred embodiment of the present invention.
Figure 2:
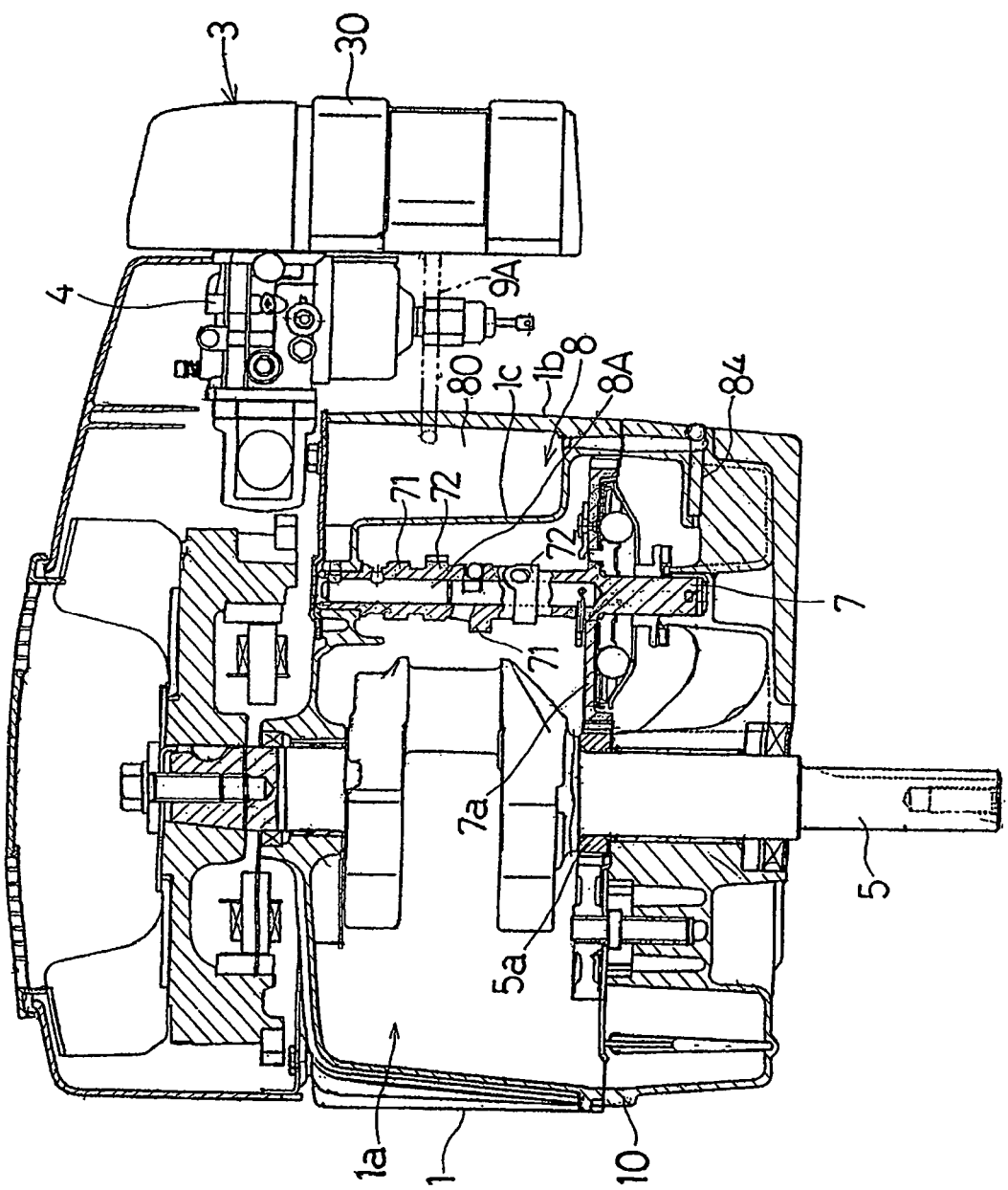
FIG. 2 is a cross-sectional view taken along the line II—II in FIG. 1.

FIG. 1 illustrates a plan view, with a portion cut out, of an important portion of a general-purpose four-cycle, two-cylinder internal combustion engine to which a breathing system according to a first preferred embodiment of the present invention is applied, and FIG. 2 illustrates a cross-sectional view taken along the line II—II in FIG. 1. The illustrated combustion engine is of a type being mounted on a working machine, for example, a small-sized snowplow, and provides a drive source for such working machine.

Referring to FIGS. 1 and 2, the combustion engine includes an engine block 20 having a crankcase 1 and two cylinders integrally formed with the crankcase 1. The two cylinders 2 are arranged to represent a V-shaped arrangement. A cylinder head 21 is fixed to each of those cylinders 2. Each of the cylinders 2 has a cylinder bore 2a defined therein. An oil pan 10 for accommodating lubricant oil is secured to a bottom region of the crankcase 1, and an air cleaner 3 and a carburetor 4, forming respective parts of an intake system of the combustion engine are disposed between the cylinders 2 of the V-shaped arrangement. A crankshaft 5, which serves as a drive output shaft, is rotatably supported by the crankcase 1 while extending vertically through the crankcase 1. A reciprocating piston 6 movable in a direction of the longitudinal axis of the cylinder bore 2a is movably accommodated within each of the cylinder bores 2a and is drivingly connected with the crankshaft 5 through a respective connecting rod 55.

A camshaft 7 is accommodated within the crank chamber 1a at a location laterally of the crankshaft 5 so as to extend parallel to the crankshaft 5. This camshaft 7 is formed with intake and exhaust cams 71 and 72, which when the camshaft 7 is driven about its longitudinal axis, drive intake and exhaust valves (not shown) through tappets 73 and then through rocker arms 74. The camshaft 7 is formed with a gear 7a adjacent a lower end portion thereof. This gear 7a meshes with a crank gear 5a fixedly mounted on the crankshaft 5 so that rotary motion of the crankshaft 5 can be transmitted to the camshaft 7.

Figure 3:
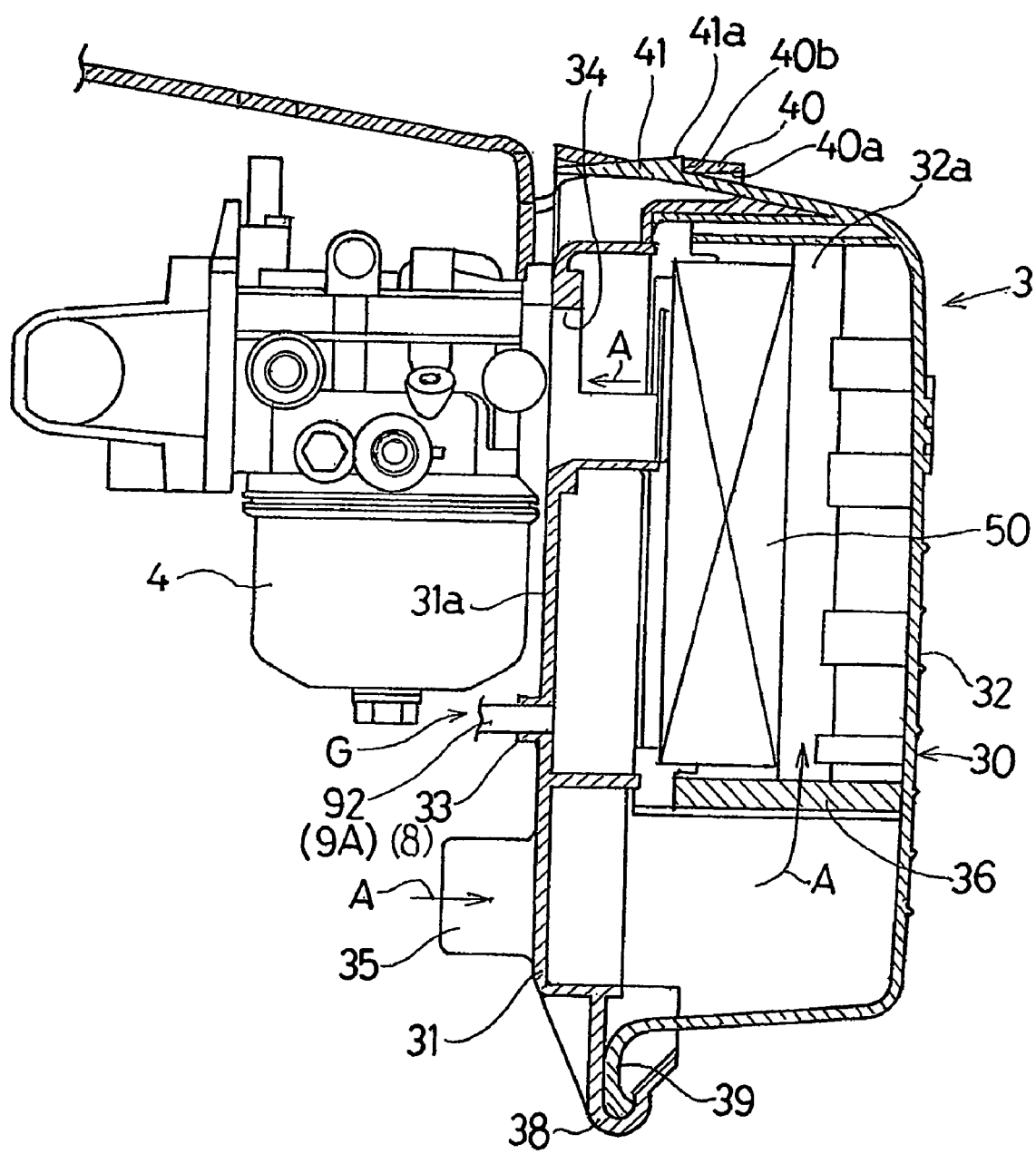
FIG. 3 is an enlarged longitudinal sectional view showing an air cleaner employed in association with the internal combustion engine.

FIG. 3 illustrates the air cleaner 3 on an enlarged scale. The air cleaner 3 includes an air cleaner casing 30 made up of first and second casing halves 31 and 32. The first and second casing halves 31 and 32 represent generally cup-like and cap-like configurations and are, therefore, separable in a horizontal direction. The first casing half 31 is positioned adjacent the carburetor 4 and has a side wall 31a. A blow-by gas inlet port 33, through which a blow-by gas G in the crank chamber 1a enters the air cleaner 3, is formed in an intermediate portion of the side wall 31a with respect to the height of the first casing half 31. This blow-by gas inlet port 33 forms a part of a breather passage 8 as will be described in detail later. Also, an intake air discharge port 34 is formed in an upper portion of the side wall 31a.

A lower portion of the side wall 31a of the first casing half 31 is formed with an air intake port 35 for introducing an air A into the air cleaner 3. The air A introduced into the air cleaner 3 through this air intake port 35 is supplied towards a cleaner element 50, accommodated within an element chamber 32a defined in the second casing half 32, through an introducing passage 36 formed within a lower region of the second casing half 32, so that the air A can be purified as it flows through the cleaner element 50. The purified air A is discharged from the air cleaner 3 through the intake air discharge port 34 and is then supplied to the carburetor 4 before introduced into the combustion engine.

Referring again to FIGS. 1 and 2, the breather passage 8 has a first breather passage portion establishing a fluid connection between the crank chamber 1a in the crankcase 1 and the air cleaner 3. In the illustrated embodiment, the first breather passage portion of the breather passage 8 includes a breather chamber 80 defined at a location laterally of the camshaft 7 within the crank chamber 1a and delimited between an outer wall portion 1b and a partition wall portion 1c, both forming respective parts of the wall of the crankcase 1. The first breather passage portion of the breather passage 8 also includes an upstream passage portion 8A extending between the breather chamber 80 and the crank chamber 1a, and a part of a downstream passage portion 9A extending between the breather chamber 80 and the air cleaner 3.

Figure 4:
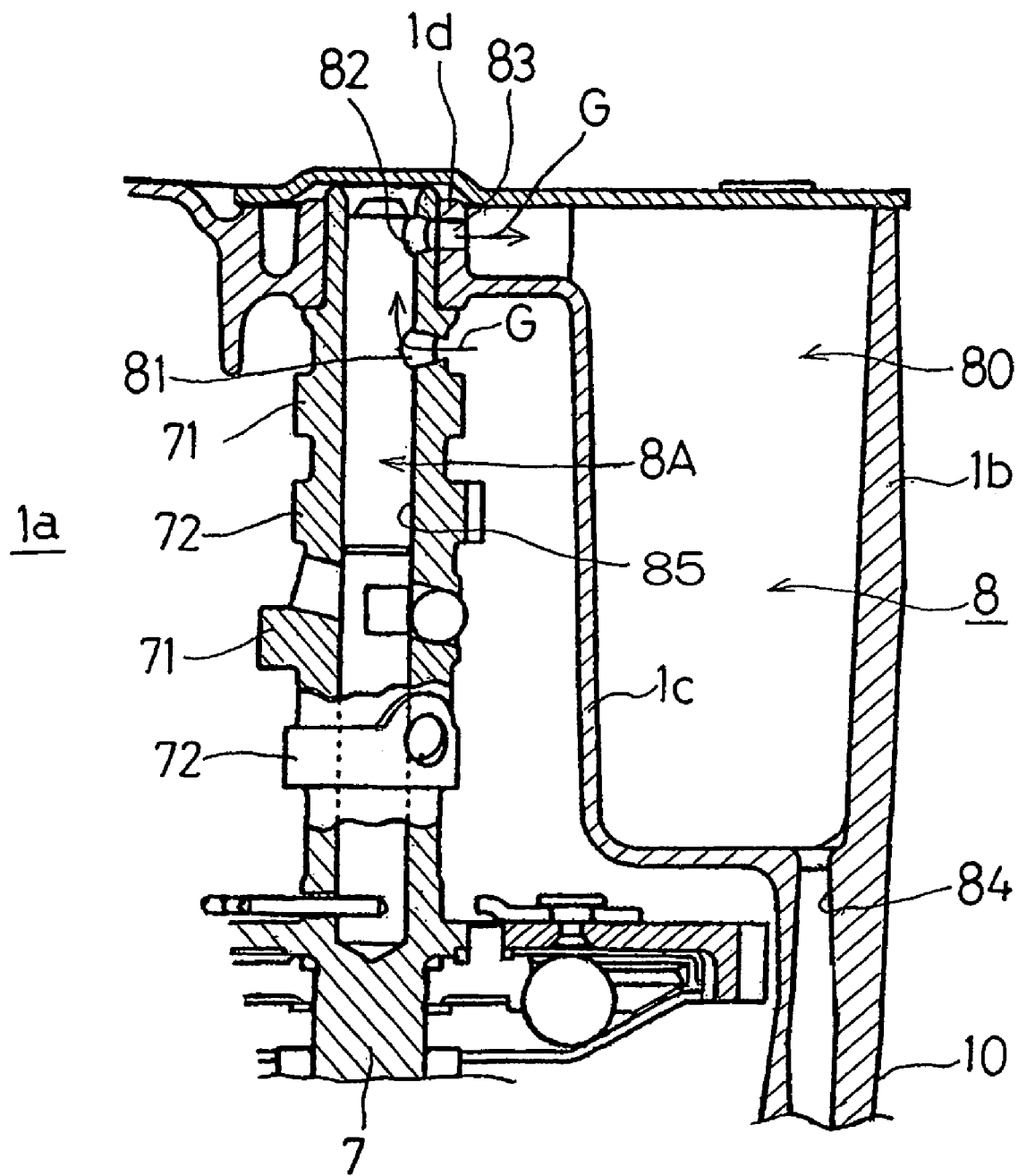
FIG. 4 is a fragmentary longitudinal sectional view showing a breather passage on an enlarged scale.

The breather passage 8 is partly shown on an enlarged longitudinal sectional representation in FIG. 4. The upstream passage portion 8A of this breather passage 8 is made up of an elongated hollow 85 and first to third transverse hole 81 to 83. The elongated hollow 85 is defined within the camshaft 7 so as to extend in an axial direction of the camshaft 7 (or in a vertical direction as viewed from FIG. 4). The first transverse hole 81 is formed in a portion of the camshaft 7 adjacent the upper intake cam 71 so as to extend in a radial direction of the camshaft 7 for communication with the elongated hollow 85. The second transverse hole 82 is formed above the first transverse port 81 and in an upper end portion of the camshaft 7, which portion is rotatably supported by a bearing portion 1d integrally formed with the crankcase 1, so as to extend in the radial direction of the camshaft 7 for communication with the elongated hollow 85. The third transverse hole 83 is formed in the bearing portion 1d rotatably supporting that upper end portion of the camshaft 7 so as to align with the second transverse hole 82 and to open into the breather chamber 81.

During the intake stroke of the combustion engine in which the piston 6 shown in FIG. 1 descends with the pressure inside the crank chamber 1a increasing, when the second transverse hole 82 of the upper end portion of the camshaft 7 aligns with the third transverse hole 83 of the bearing portion 1d of the crankcase 1, the upstream passage portion 8A allows the blow-by gas G within the crank chamber 1a to flow into the elongated hollow 80 through the first transverse hole 81 and subsequently into the breather chamber 80 through the second and third transverse holes 82 and 83. During the strokes other than the intake stroke, the second transverse hole 82 is held out of alignment with the third transverse hole 83 and, therefore, the blow-by gas G does not flow into the breather chamber 80. An oil component separated from the blow-by gas G within the breather chamber 80 is returned to the crank chamber 1a through a recovery passage 84.

As shown in FIG. 1, the downstream passage portion 9A of the breather passage 8 is made up of a cylinder passage 91, so formed as to extend from the breather chamber 80 through the cylinder 2 and the corresponding cylinder head 21, and a breather tube 92 made of a synthetic resin and disposed to connect a discharge end 91a of the cylinder passage 91 and the blow-by gas inlet port 33 of the air cleaner 3. The blow-by gas G flowing into the breather chamber 80 flows towards the air cleaner 3 through the cylinder passage 91 and then through the breather tube 92, as shown by the arrow.

Figure 5:
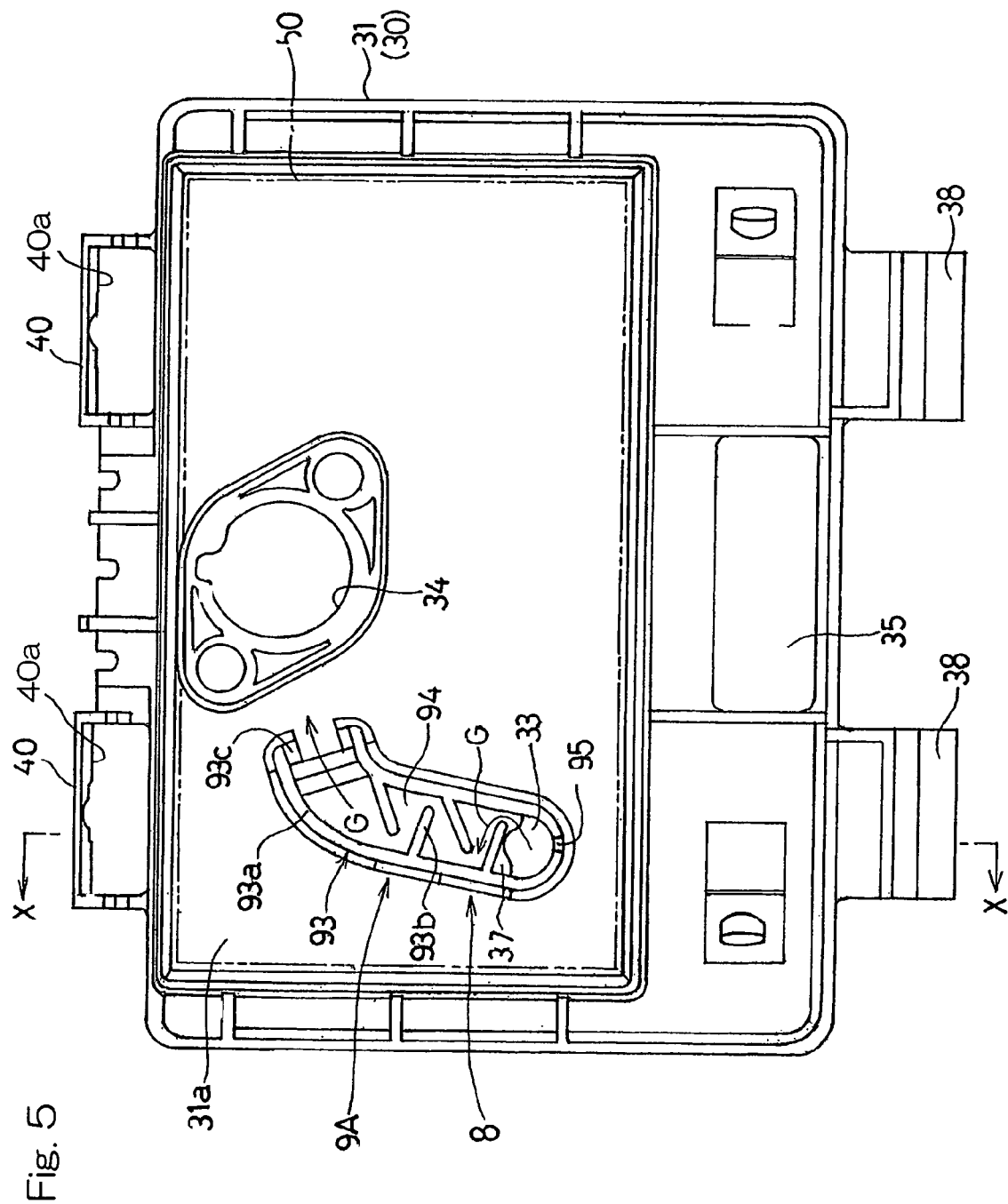
FIG. 5 is a side view, on an enlarged scale, showing the interior of a first casing half forming a part of an air cleaner casing for the air cleaner shown in FIG. 3.
Figure 6:
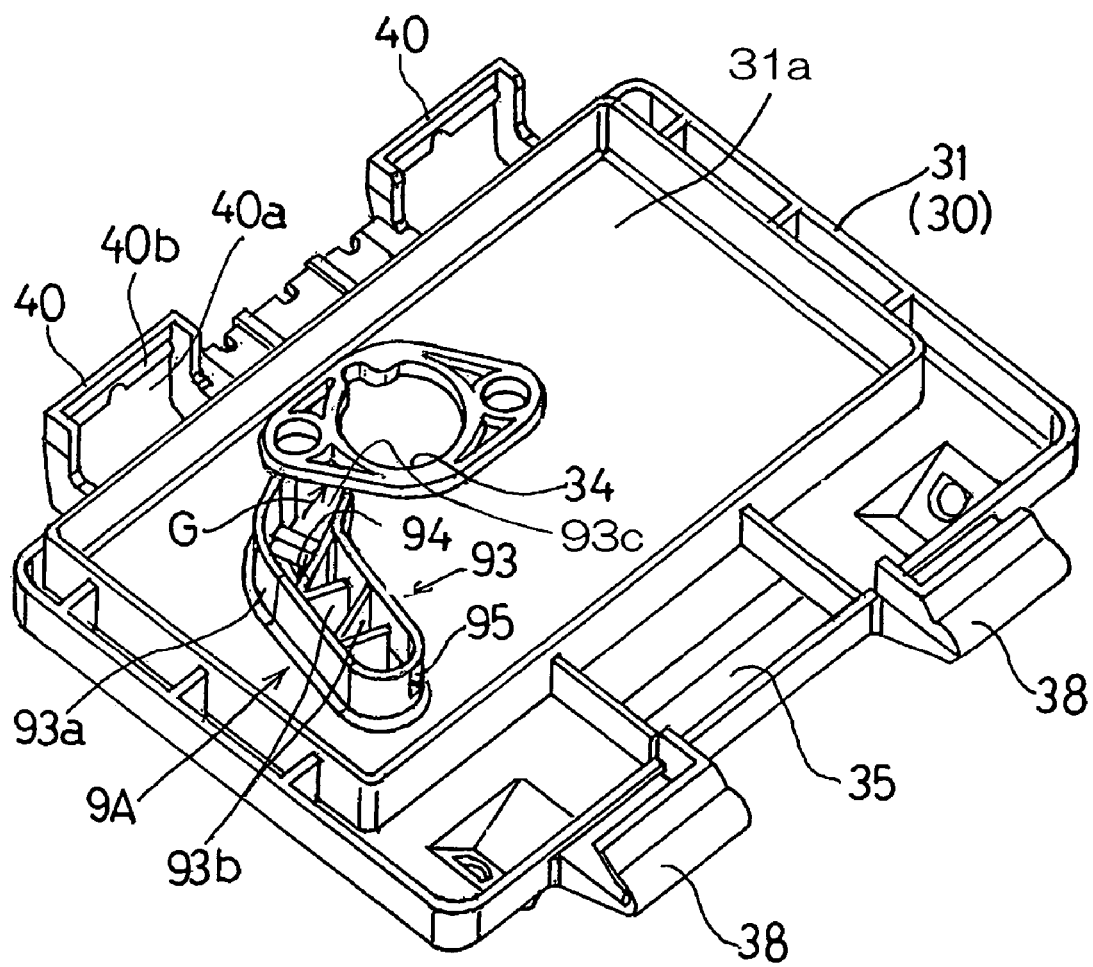
FIG. 6 is a perspective view of the first casing half of the air cleaner casing.

FIG. 5 illustrates a side view showing the interior of the first casing half 31 of the air cleaner casing 30 and FIG. 6 illustrates the first casing half 31 in a perspective representation. As hereinbefore described briefly, the intake air discharge port 34, through which the air purified by the cleaner element 50 is supplied from the air cleaner 3 to the carburetor 4 shown in FIG. 3, is defined in an upper center portion of the side wall 31a of the first casing half 31. The blow-by gas inlet port 33 for receiving the blow-by gas G from the breather chamber 80 is defined laterally of and below the intake air discharge port 34. The air intake port 35 is defined at a lower end portion of the side wall 31a. Also, the first casing half 31 is formed with a curved passage portion (a second breather passage portion) 93 curved from the blow-by gas inlet port 33 towards the intake air discharge port 34 and forming a part of the downstream passage portion 9A of the breather passage 8.

In the illustrated embodiment, a zigzag flow path 94 is formed in the curved passage portion 93 so as to allow the blow-by gas G to flow in a zigzag fashion so that a water component contained in the blow-by gas G can be separated and removed from the blow-by gas G by the effect of an inertia force. More specifically, the side wall 31a of the first casing half 31 is, as best shown in FIG. 6, formed integrally with a generally U-shaped wall 93a. This U-shaped wall 93a opens in a lateral direction of the first casing half 31 or opens into the interior of the air cleaner casing 30 and is curved from the blow-by gas inlet port 33 towards the intake air discharge port 34. Opposite wall portions of the U-shaped wall 93a are formed integrally with a plurality of baffling plates 93b that protrude from the respective wall portions into the zigzag flow path 94. The baffling plates 93b protruding from one wall portion of the U-shaped wall 93a and the baffling plates 93b protruding from the other wall portion alternately extend in the zigzag flow path 94 in directions different from each other. The zigzag flow path 94 is delimited by the U-shaped wall 93a, the baffling plates 93b integral with the U-shaped wall 93a and a passage cover 96 for closing the opening of the U-shaped wall 93a opposite to the side wall 31a as will be described later.

At the upstream end portion of the zigzag flow path 94 where the blow-by gas G flows into the curved passage portion 93 through the blow-by gas inlet port 33, a drain hole 95, through which the water component separated from the blow-by gas G can be drained into the air cleaner casing 30, is formed in a lowermost portion of the upright wall 93a by removing such lowest portion of the U-shaped wall 93a.

Figure 7:
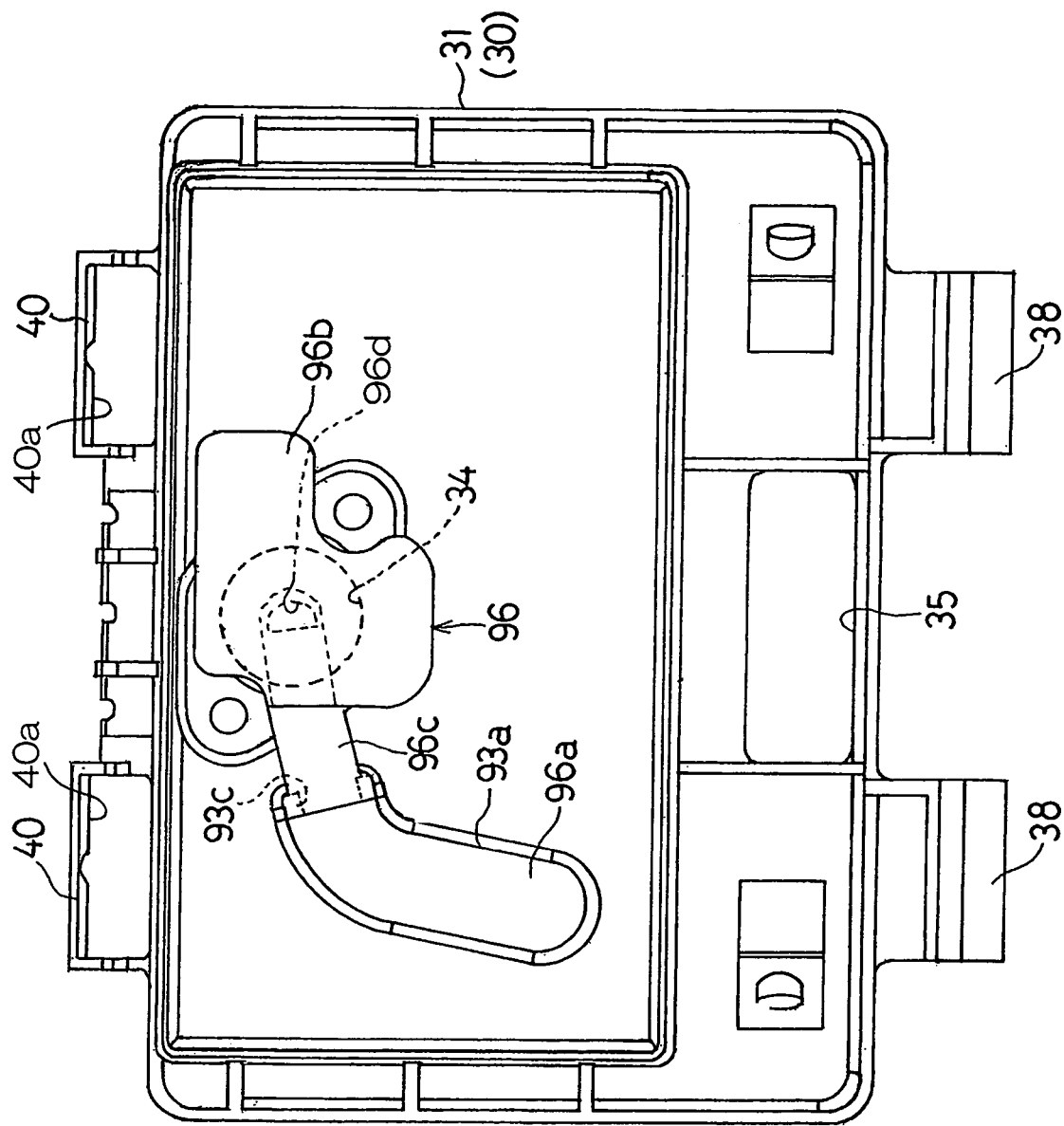
FIG. 7 is a side view of the first casing half of the air cleaner casing having a curved passage portion covered by a passage cover.
Figure 8:
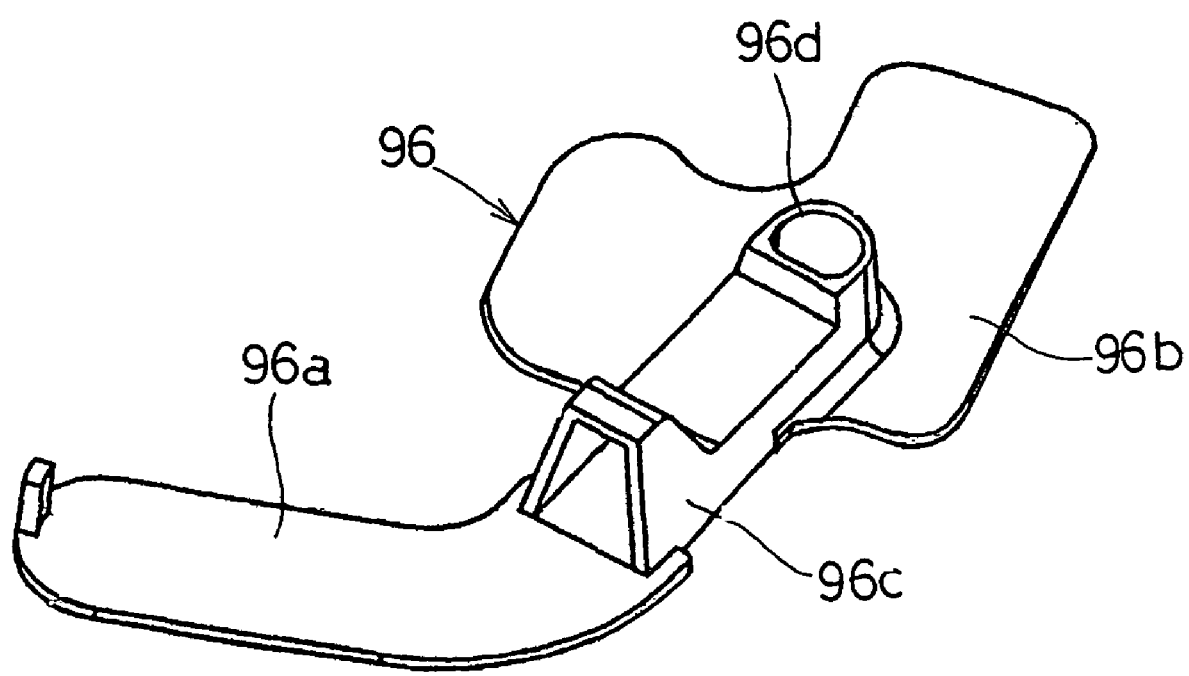
FIG. 8 is a perspective view of the passage cover as viewed from a rear side thereof.

FIG. 7 is a side view, showing a condition in which the curved passage portion 93 is formed by closing the opening of the U-shaped wall 93a with the passage cover 96, and FIG. 8 is a perspective view of the passage cover 96 as viewed from a rear side thereof. The passage cover 96 is curved to follow the curvature of the U-shaped wall 93a (FIG. 5) and is made up of a first flat plate member 96a for covering the opening of the U-shaped wall 93a, a second flat plate member 96b for covering the opening outwardly of the intake air discharge port 34 (FIG. 5), and a substantially rectangular connecting tube 96c disposed between the first and second flat plate members 96a and 96b and having one end connected with a gas discharge port 93c (FIG. 5) which is a generally U-shaped open free end of the U-shaped wall 93a. The other end of this connecting tube 96c adjacent the second flat plate member 96b is formed with a bushing 96d that is partly inserted into the intake air discharge port 34.

Figure 9:
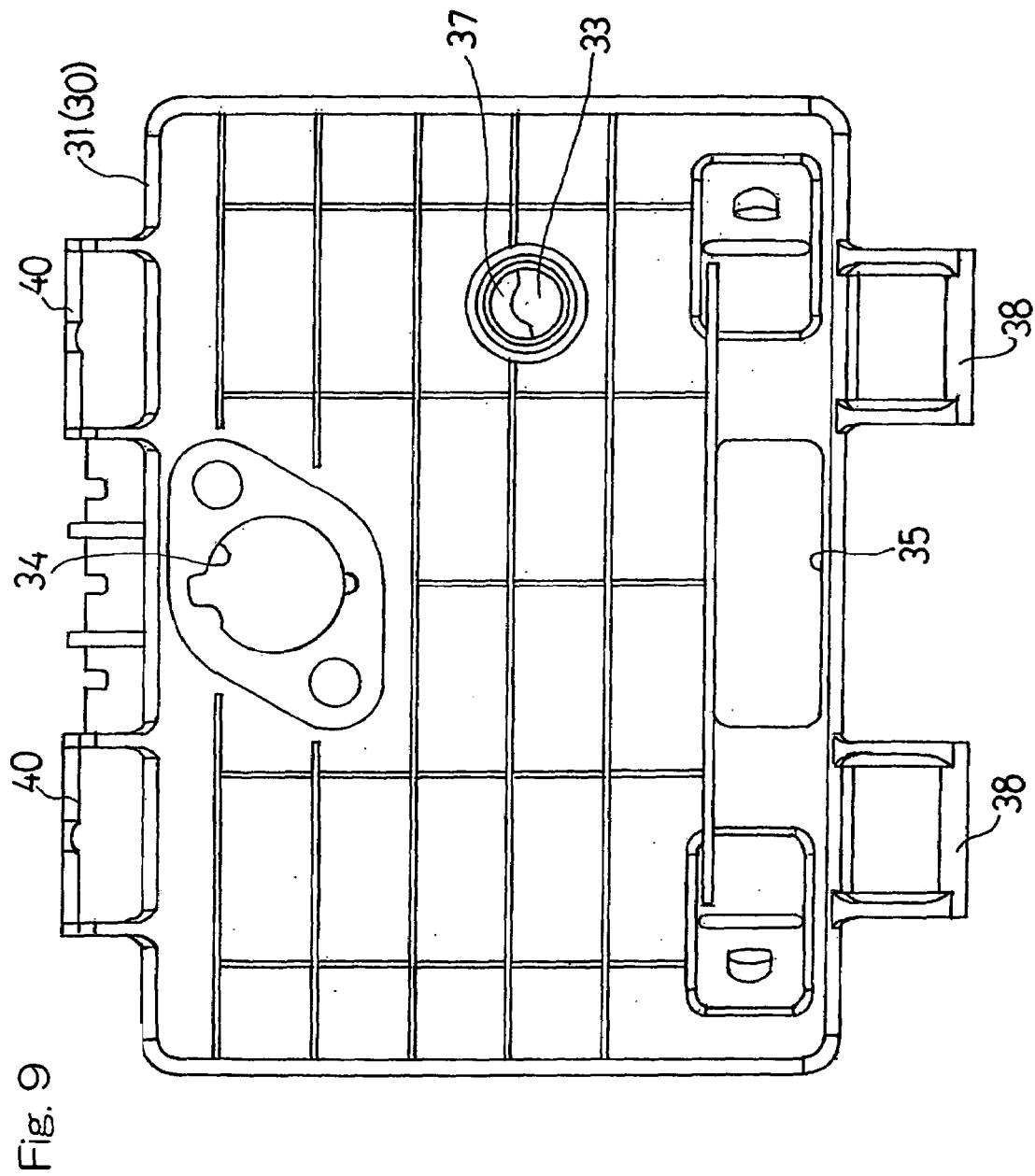
FIG. 9 is a side view showing an outer appearance of the first casing half of the air cleaner casing.
Figure 10:
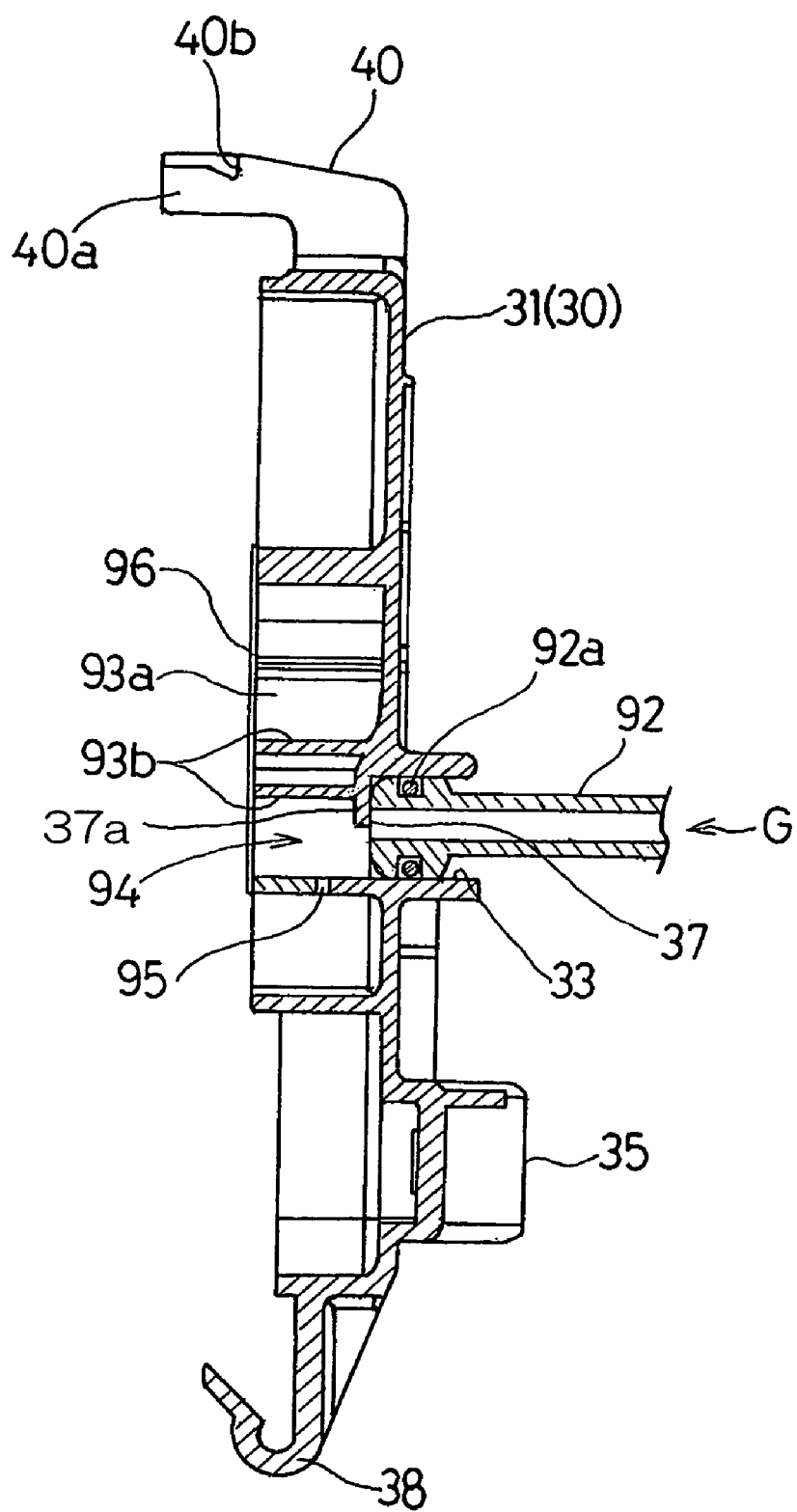
FIG. 10 is a cross-sectional view taken along the line X—X in FIG. 5.

FIG. 9 is a side view showing an outer appearance of the first casing half 31 of the air cleaner casing 3 and FIG. 10 is a cross-sectional view taken along the line X—X in FIG. 5. The breather tube 92 is fluidly connected with the blow-by gas inlet port 33. One end of the breather tube 92 has a sealing member 92a in the form of, for example, an O-ring mounted thereon so that a gap between the blow-by gas inlet port 33 and the breather tube 92 can be sealed off. In a region deep into the blow-by gas inlet port 33 or in an axially intermediate region of the blow-by gas inlet port 33, the first casing half 31 is formed integrally with a baffling projection 37 that extends from an upper area of the blow-by gas inlet port 33 to a position substantially intermediate of the height of the blow-by gas inlet port. The drain hole 95 is located below the baffling projection 37. As best shown in FIG. 10, the baffling projection 37 has a baffling face 37a lying perpendicular to the direction of flow of the blow-by gas G so that the water component can be separated and removed from the blow-by gas G when the latter collides against the baffling face 37a.

Figure 11:
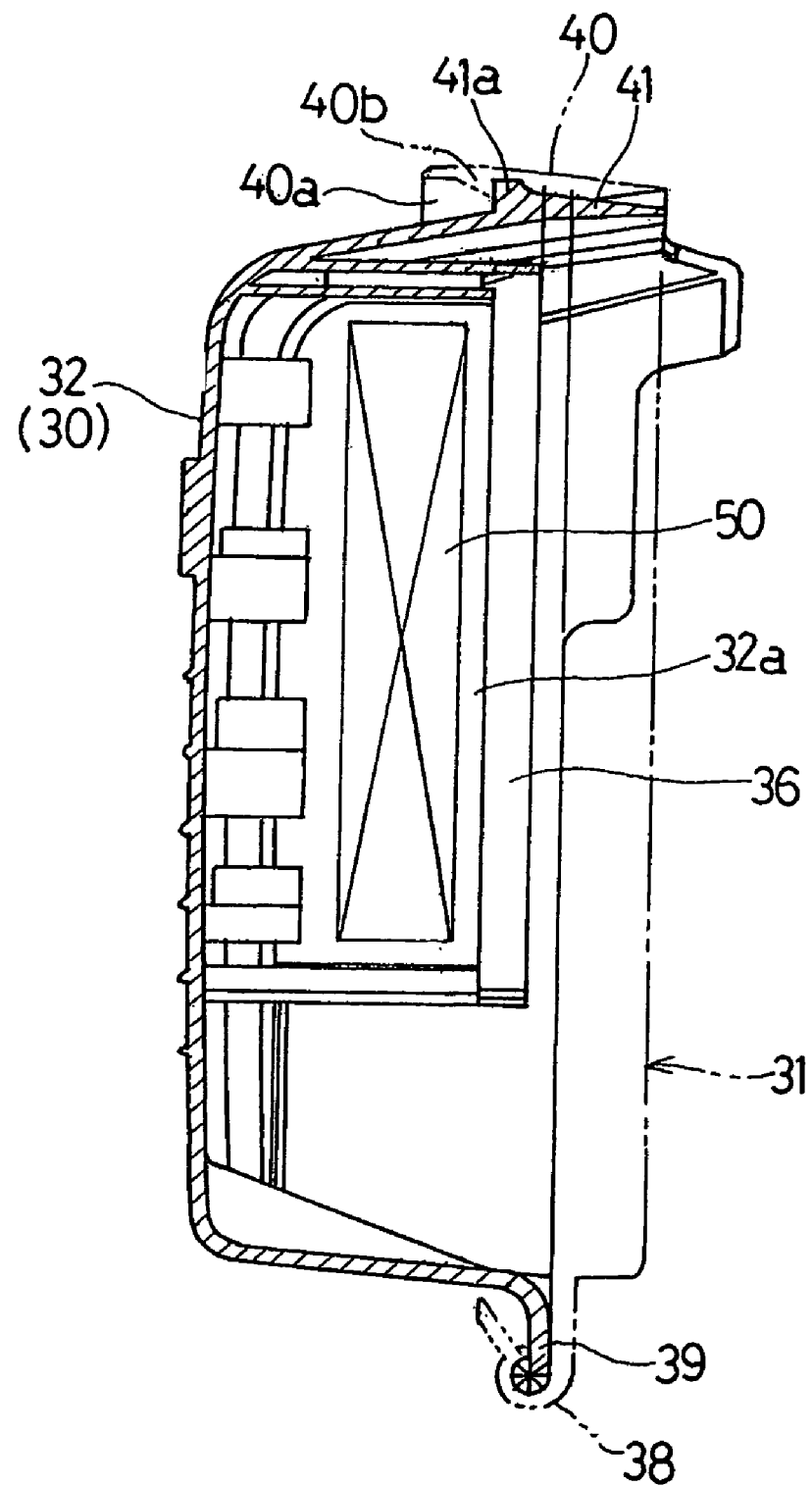
FIG. 11 is a longitudinal sectional view showing a second casing half forming another part of the air cleaner casing.

FIG. 11 is a longitudinal sectional view of the second casing half 32 that is mounted on the first casing half 31 and closes the opening of the latter. This second casing half 32 has a lower end portion formed with engagements 39 adapted to be inserted into and, hence, engaged in respective retainers 38 (FIG. 5) provided in a lower end of the first casing half 31. The second casing half 32 also has an upper end portion formed with engagement pawls 41 adapted to be inserted into respective insertion holes 40a defined in corresponding catch members 40 (FIG. 5) provided in an upper end of the first casing half 31. An engagement 41a is formed integrally with each of the engagement pawls 41 and, on the other hand, a stopper 40b for engagement with the respective engagement 41a is formed integrally with the first casing half 31 at an upper area of the insertion hole 40a for receiving therein the corresponding engagement pawl 41.

When the first casing half 31 and the second casing half 32 are assembled to form the cleaner casing 30, while the engagements 39 of the second casing half 32 are engaged in the corresponding retainers 38 of the first casing half 31, the engagement pawls 41 of the second casing half 32 have to be inserted into the corresponding insertion holes 40a in the catch members 40 provided in the first casing half 31 so that the engagements 41a of the engagement pawls 41 can be engaged in the stoppers 40b in the insertion holes 40a.

The operation of the breathing system of the structure described above will now be described.

As a result of change in pressure inside the crank chamber 1a, which is brought about by the reciprocating motion of the piston 6 (FIG. 1), the blow-by gas G flowing from the combustion chamber 22 into the crank chamber 1a through a gap between the piston 6 and a liner 23 in each of the cylinders 2 is introduced into the breather chamber 80 through the upstream passage portion 8A of the breather passage 8 (FIG. 4).

The blow-by gas G so introduced into the breather chamber 80 is reduced in flow velocity and pressure within the breather chamber 80 to allow an oil component such as oil mist to be separated and, hence, removed from the blow-by gas G. The removed oil component is subsequently returned to the crank chamber 1a through the recovery passage 84. The blow-by gas G within the breather chamber 80 flows through the downstream passage portion 9A (FIG. 1) of the breather passage 8 and then towards a downstream area of the cleaner element 50 within the air cleaner 3, that is, towards the intake air discharge port 34.

When the blow-by gas G is supplied to the intake air discharge port 34 through the downstream passage portion 9A of the breather passage 8, since the downstream passage portion 9A is provided with the curved passage portion 93 curved within the first casing half 31 from the blow-by gas inlet port 33 towards the intake air discharge port 34, a water component contained in the blow-by gas G and having a high specific gravity collides against an inner surface of the curved passage portion 93 under the influence of a centrifugal force developed as the blow-by gas G flows along the curved path of the curved passage portion 93 and is therefore separated and removed from the blow-by gas G. In particular, since the zigzag flow path 94 is defined in the curved passage portion 93 so as to extend from the blow-by gas inlet port 33 to the intake air discharge port 34, the blow-by gas G collides against the baffling plates 93b provided within this zigzag flow path 94 and, therefore, the water component contained in the blow-by gas G can be efficiently separated and removed from the blow-by gas G.

Also, as shown in FIG. 10, since the baffling projection 37 is formed in the deep region of the blow-by gas inlet port 33 to which the breather tube 92 is connected, the blow-by gas G from the breather tube 92 collides against the baffling projection 37 so that the water component contained in the blow-by gas G can be further separated and removed.

The water component so removed from the blow-by gas G can be discharged into the first casing half 31 through the drain hole 95 defined in the lowermost portion (the most downstream portion) of the curved passage portion 93. Also, the blow-by gas G, from which the water component has been separated and removed, is supplied to the carburetor 4 though the intake air discharge port 34 together with the air purified by the cleaner element 50, so that reburning of the blow-by gas G can be carried out within the combustion chamber 22 (FIG. 1).

Figure 12:
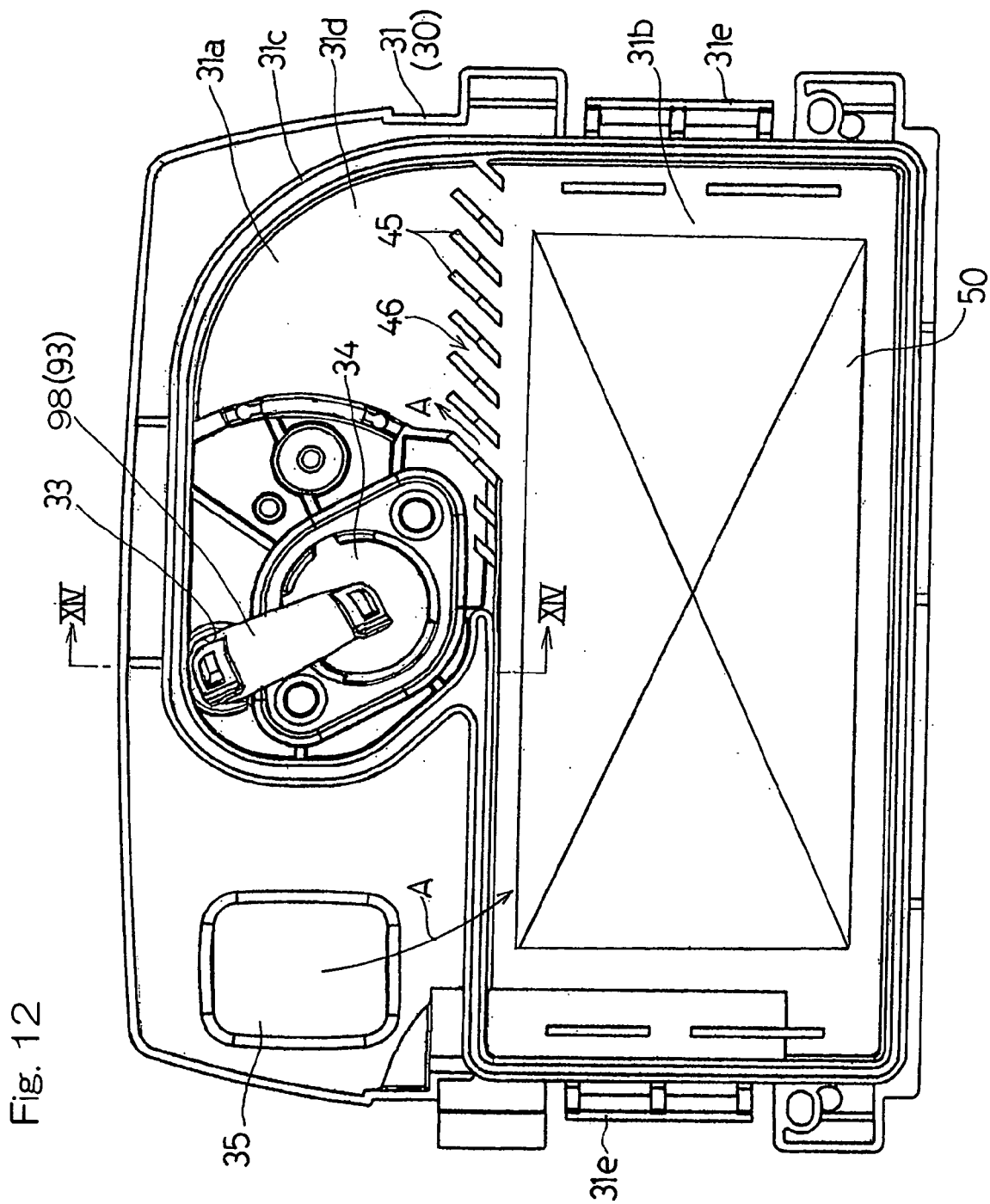
FIG. 12 is a side view showing the interior of the first casing half of the air cleaner casing formed with a breather passage according to a second preferred embodiment of the present invention.
Figure 13:
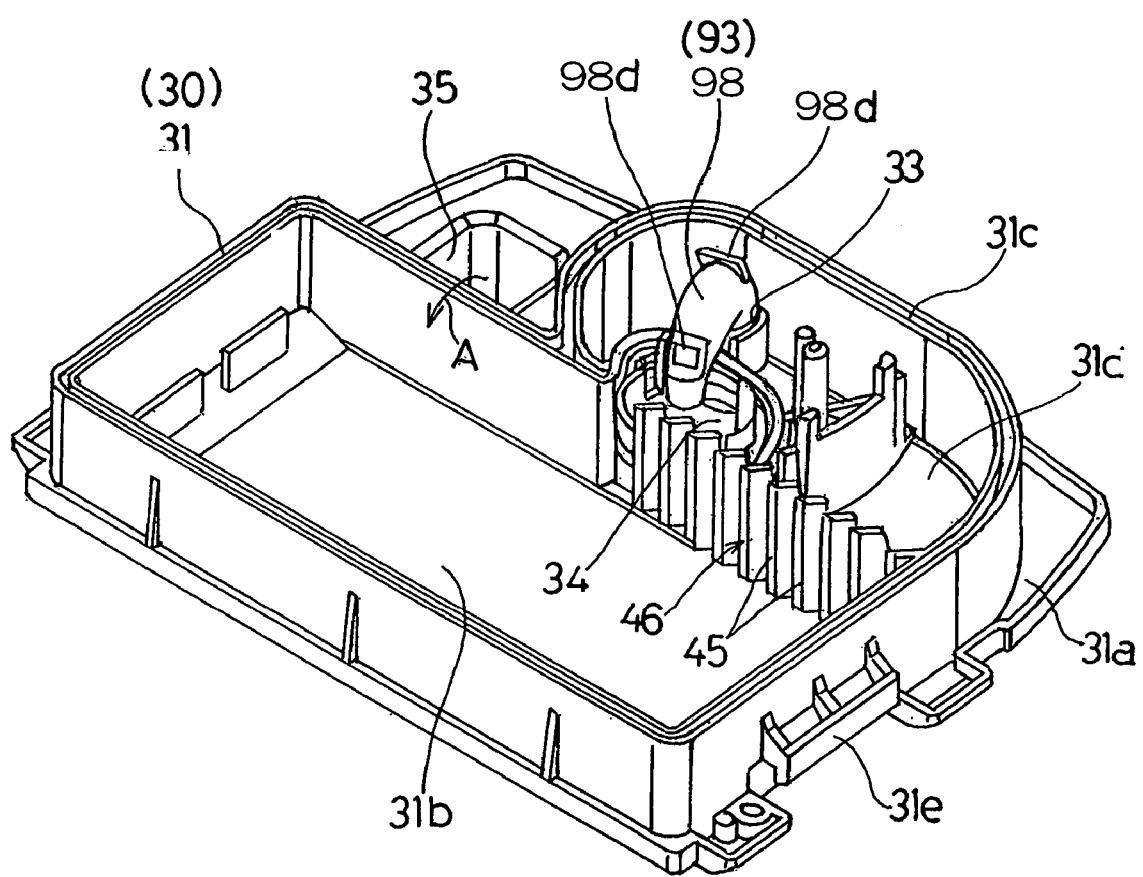
FIG. 13 is a perspective view of the first casing half of the air cleaner casing of FIG. 12.

The breathing system according to a second preferred embodiment of the present invention will now be described. FIG. 12 illustrates, in a side view, the interior of the first casing half 31 formed with the breather passage according to the second embodiment of the present invention and FIG. 13 is a perspective view thereof. The first casing half 31 is formed with an element chamber 31b for accommodating the cleaner element 50. This first casing half 31 is also formed with the blow-by gas inlet port 33 that is positioned above the element chamber 31b and generally intermediate of the width of the first casing half 31 and protrudes outwardly from the side wall 31a of the first casing half 31. The first casing half 31 is further formed with the intake air discharge port 34 below and adjacent the blow-by gas inlet port 33. The air intake port 35 is formed in the first casing half 31 at a location laterally of the blow-by gas inlet port 33 and above the element chamber 31b. The air A entering the air intake port 35 is introduced into the element chamber 31b. As the air A flows through the cleaner element 50 within the element chamber 31b, the air A can be purified and is then introduced into a delivery chamber 31d by way of a plurality of passages 46 defined among a plurality of projecting plates 45 arranged between the intake air discharge port 34 and the element chamber 31b. The purified air A so introduced into the delivery chamber 31d subsequently flows through the intake air discharge port 34 towards the carburetor 4 (FIG. 3).

Around the element chamber 31b, the blow-by gas inlet port 33 and the intake air discharge port 34, a sealing wall 31c is formed so as to protrude from the side wall 31a of the first casing half 31 and is cooperable with a second casing half (not shown) to seal the inside of the first casing half 31 from the outside. The second casing half 32 is mounted on the first casing half 31 by a plurality of mounting elements 31e so that the sealing wall 31c can seal the element chamber 31b and the delivery chamber 31d from the outside.

Figure 14:
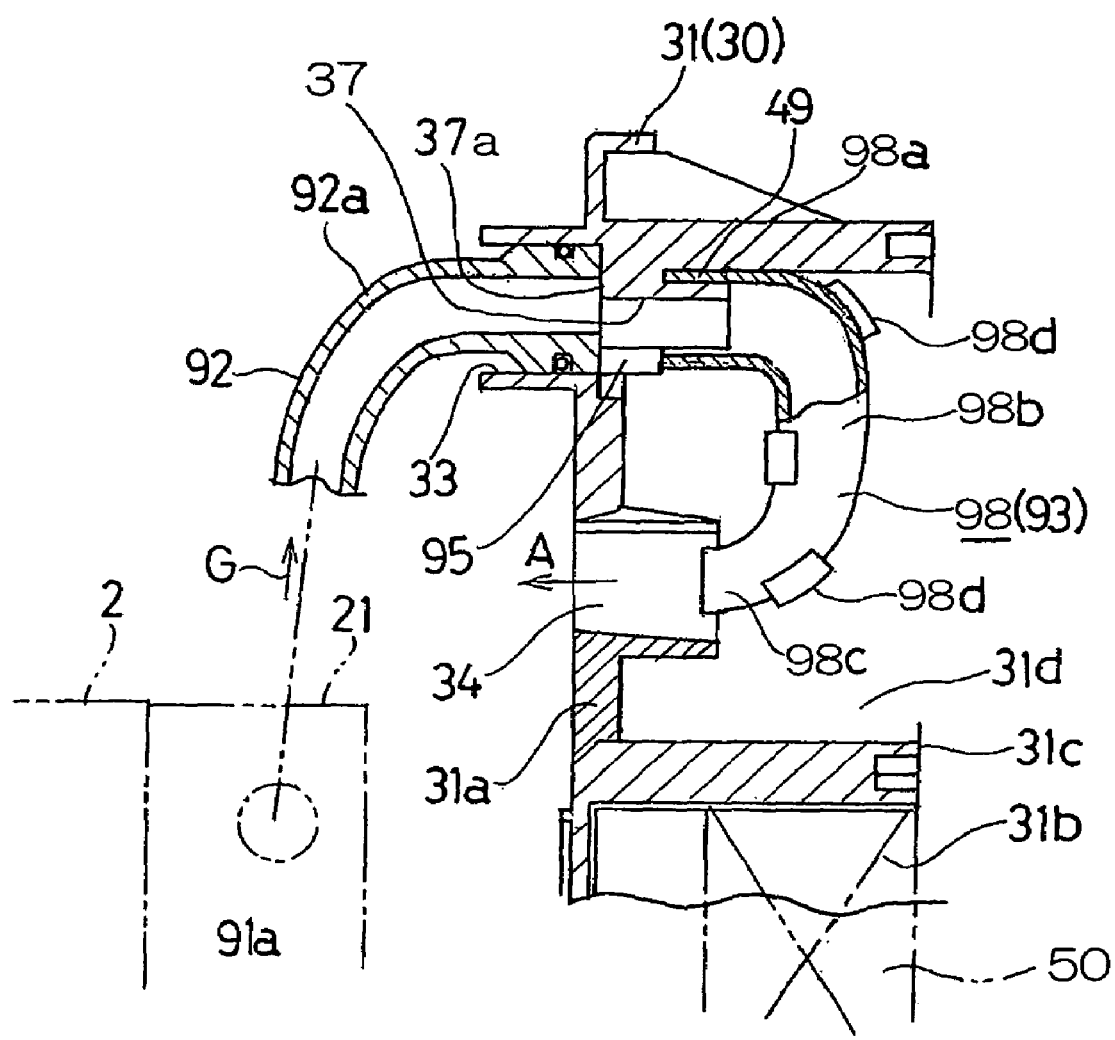
FIG. 14 is a cross-sectional view taken along the line XIV—XIV in FIG. 12.

FIG. 14 is a cross-sectional view taken along the line XIV-XIV in FIG. 12. The breather tube 92 extending from the cylinder 2 is connected to an outer portion of the blow-by gas inlet port 33. This breather tube 92 extends upwardly from the discharge end 91a of the cylinder head 21 and is then curved at an introducing passage portion 92a on an upstream side of the blow-by gas inlet port 33 so as to extend substantially horizontally, representing a generally L-shaped configuration. A generally U-shaped duct 98 forming a curved passage portion is provided between an inner portion of the blow-by gas inlet port 33 and the intake air discharge port 34. A drain hole 95 for discharging into the first casing half 31 a water component, separated and removed from the blow-by gas G, is formed in a lower portion of the connection between the duct 98 and the blow-by gas inlet port 33. Even in this second embodiment, the baffling projection 37 for separating and removing the water component contained in the blow-by gas G when the blow-by gas G collides against the baffling face 37 of the baffling projection 37 is formed in a region deep into the blow-by gas inlet port 33 with which the breather tube 92 is fluidly connected. The drain hole 95 is positioned below the baffling projection 37.

The duct 98 has a large diameter duct portion 98a, a duct body 98b and a small diameter duct portion 98c. The large diameter duct portion 98a defines an upstream duct portion of the duct 98 and is fitted to the connection with the blow-by gas inlet port 33. The duct body 98b has a cross-sectional area (passage area) progressively decreasing from the large diameter duct portion 98a while curved in a generally U-shaped configuration from the large diameter duct portion 98a. The small diameter duct portion 98c, defining a downstream duct portion of the duct 98, is formed at a downstream end of the duct body 96b and inserted into an upstream portion of the intake air discharge port 34. The small diameter duct portion 98c has a cross-sectional area (passage area) smaller than those of the large diameter duct portion 98a and the duct body 98b and, therefore, has an outer diameter smaller than those of the large diameter duct portion 98a and the duct body 98b. Also, this duct 98 is made up of two split tube members, which are connected together by a plurality of connecting elements 96d.

Figure 15:
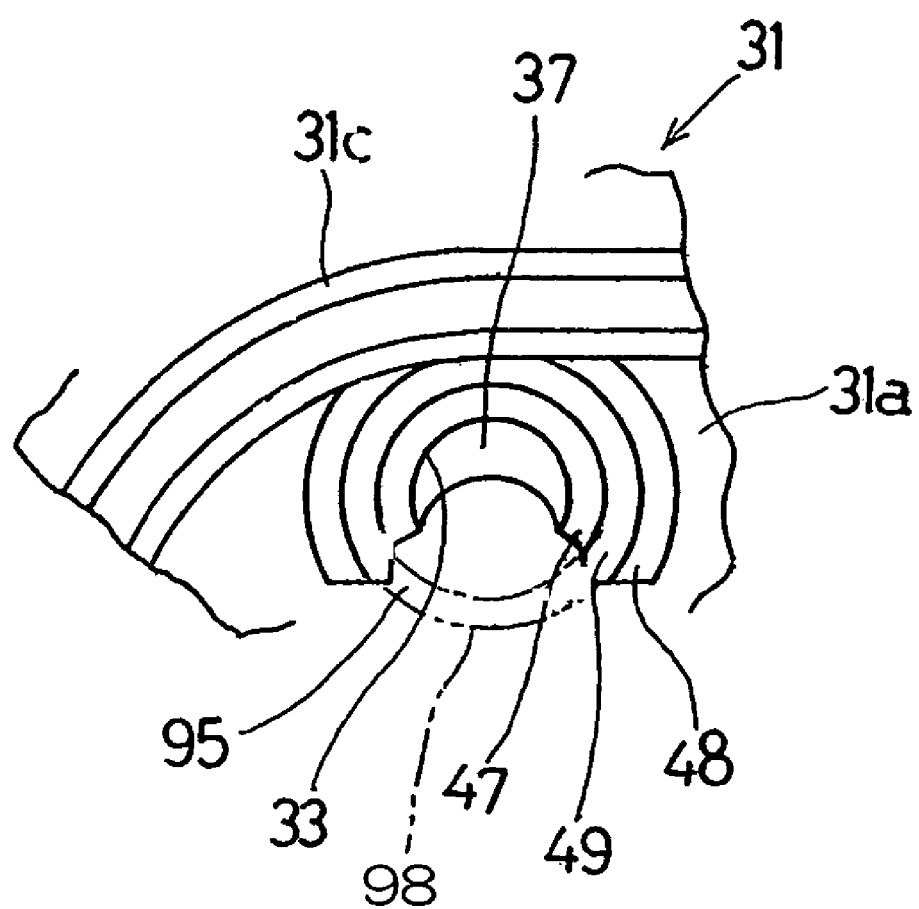
FIG. 15 is a side view, on an enlarged scale, showing a duct connection in a side wall of the first casing half of the air cleaner casing.

As shown in FIG. 15 in an enlarged side view, the side wall 31a of the first casing half 31 has a portion, corresponding to the connection between the blow-by gas inlet port 33 and the duct 98, formed with inner and outer tubes 47 and 48 in a coaxial relation. A groove 49 is formed between the inner and outer tubes 47 and 48 to receive and fix the large diameter duct portion 98a (FIG. 14) of the duct 98. A lower portion of each of the inner and outer tubes 47 and 48 is depleted to define the drain hole 95.

According to the second embodiment of the present invention, when the blow-by gas G flows into the air cleaner 3 through the breather tube 92 by way of the blow-by gas inlet port 33, the blow-by gas G collides against the baffling face 37a of the baffling projection 37, disposed in the deep region of the blow-by gas inlet port 33, resulting in removal of the water component contained in the blow-by gas G. Also, since the generally U-shaped duct 98 is disposed between the blow-by gas inlet port 33 and the intake air discharge port 34, the water component contained in the blow-by gas G and having a high specific gravity collides against the inner surface of the duct 98 under the influence of a centrifugal force developed as the blow-by gas G flows along the curved path of the duct 98 and is therefore separated and removed from the blow-by gas G. In addition, since the introducing passage portion 92a of the breather tube 92 is curved, the water component contained in the blow-by gas G can also be separated and removed as the blow-by gas g flows through the introducing passage portion 92a.

The water component removed from the blow-by gas G can be discharged into the first casing half 31 through the drain hole 95 defined in the lower portion of the connection between the duct 98 and the blow-by gas inlet port 33. Also, the blow-by gas G, from which the water component has been separated and removed, is supplied to the carburetor 4 through the intake air discharge port 34 together with the air purified by the cleaner element 50, so that reburning of the blow-by gas G can be carried out within the combustion chamber 22. At this time, since the downstream duct portion of the duct 98 is constituted by the small diameter duct portion 98c having the diameter smaller than the upstream duct portion 98a, the ejector effect brought about by the air flowing out of the intake air discharge port 34 effectively acts on the exit of the small diameter duct portion 98c, resulting in the smooth discharge of the blow-by gas G from the duct 98.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A breathing system in a combustion engine having a crankcase, which comprises:

an air cleaner including a replaceable cleaner element and operable to purify air to be supplied to the combustion engine as the air flows through the cleaner element, the air cleaner including a cleaner casing having a blow-by gas inlet port and an intake air discharge port both defined therein downstream of the cleaner element;

a breather passage having a first breather passage portion and a second breather passage portion;

the first breather passage portion having a breather chamber provided in a crank chamber of the crankcase for separating an oil component from a blow-by gas flowing from the crank chamber, and fluidly connecting the blow-by gas inlet port of the cleaner casing and the breather chamber in the crank chamber;

the second breather passage portion being formed downstream of the cleaner element inside the cleaner casing to define a curved passage portion that extend between the blow-by gas inlet port and the intake air discharge port to fluidly connect the blow-by gas inlet port and the intake air discharge port, the second breather passage portion also having a drain hole defined therein for draining into the cleaner casing a water component, separated from the blow-by gas flowing through the breather passage.

2. The breathing system in the combustion engine as claimed in claim 1, further comprising a baffling projection formed in the blow-by gas inlet port and against which the blow-by gas collides and wherein the baffling projection extends from an upper area of the blow-by gas inlet port to a position substantially intermediate of the height of the blow-by gas inlet port and has a baffling face lying perpendicular to a direction of flow of the blow-by gas.

3. The breathing system in the combustion engine as claimed in claim 1, wherein the blow-by gas inlet port is positioned below the intake air discharge port and the curved passage portion is formed with a zigzag flow path for flowing the blow-by gas in a zigzag fashion and wherein the drain hole is defined in a lowermost portion of the curved passage portion, and wherein the cleaner casing also includes a vertically extending side wall having the blow-by gas inlet port and the intake air discharge port both defined therein on the downstream side of the cleaner element and wherein the zigzag flow path includes a generally U-shaped wall formed integrally with the side wall of the cleaner casing, a plurality of baffling plates so formed integrally with the U-shaped wall as to protrude into the zigzag flow path, and a passage cover for closing an opening of the U-shaped wall opposite to the side wall of the cleaner casing.

4. The breathing system in the combustion engine as claimed in claim 1, wherein the blow-by gas inlet port is positioned adjacent the intake air discharge port and the curved passage portion is formed in a duct generally U-shaped along a passage therein, the duct having a downstream duct portion inserted into an upstream portion of the intake air discharge port.

5. The breathing system in the combustion engine as claimed in claim 4, wherein the blow-by gas inlet port is formed with a baffling projection against which the blow-by gas collides and which extends from an upper area of the blow-by gas inlet port to a position substantially intermediate of the height of the blow-by gas inlet port and the drain hole is formed in a lower portion of a connection between the duct and the blow-by gas inlet port.

6. The breathing system in the combustion engine as claimed in claim 4, wherein the duct has a cross-sectional passage area that gradually decreases from the blow-by gas inlet port to the intake air discharge port.

7. The breathing system in the combustion engine as claimed in claim 1, wherein the cleaner casing includes first and second casing halves, which are separable from each other in a horizontal direction, the first casing half being positioned adjacent a carburetor and is provided with the blow-by gas inlet port for receiving the blow-by gas, the intake air discharge port and the curved passage portion, whereas the second casing half accommodates the cleaner element for purifying the air.

* * * * *